United States Patent
Näslund et al.

(10) Patent No.: US 8,332,912 B2
(45) Date of Patent: Dec. 11, 2012

(54) METHOD AND APPARATUS FOR DETERMINING AN AUTHENTICATION PROCEDURE

(75) Inventors: Mats Näslund, Bromma (SE); John Michael Walker, The Hague (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 5 days.

(21) Appl. No.: 12/521,717

(22) PCT Filed: Jan. 4, 2007
(Under 37 CFR 1.47)

(86) PCT No.: PCT/EP2007/050097
§ 371 (c)(1),
(2), (4) Date: Nov. 11, 2010

(87) PCT Pub. No.: WO2008/080637
PCT Pub. Date: Jul. 10, 2008

(65) Prior Publication Data
US 2011/0093919 A1    Apr. 21, 2011

(51) Int. Cl.
*H04L 29/06* (2006.01)
(52) U.S. Cl. ............. 726/3; 726/2; 726/4; 726/5; 726/6; 709/223; 709/227; 455/411; 455/406; 455/445
(58) Field of Classification Search .................. None
See application file for complete search history.

(56) References Cited

U.S. PATENT DOCUMENTS

| | | | |
|---|---|---|---|
| 6,035,198 A * | 3/2000 | Wiehe | 455/445 |
| 6,879,690 B2 * | 4/2005 | Faccin et al. | 380/247 |
| 7,480,801 B2 * | 1/2009 | Euchner et al. | 713/171 |
| 7,484,012 B2 * | 1/2009 | Hinton et al. | 709/250 |
| 7,506,370 B2 * | 3/2009 | Aggarwal | 726/14 |
| 7,626,963 B2 * | 12/2009 | Patel et al. | 370/331 |
| 7,639,802 B2 * | 12/2009 | Gundavelli et al. | 380/44 |
| 7,707,293 B2 * | 4/2010 | Zhang | 709/227 |
| 7,774,828 B2 * | 8/2010 | Benenati et al. | 726/5 |
| 7,870,389 B1 * | 1/2011 | Leung et al. | 713/168 |
| 7,881,468 B2 * | 2/2011 | Haddad | 380/247 |
| 7,882,346 B2 * | 2/2011 | O'Neill et al. | 713/153 |
| 7,900,242 B2 * | 3/2011 | Malinen et al. | 726/6 |
| 7,934,094 B2 * | 4/2011 | Oyama | 713/168 |
| 7,962,122 B2 * | 6/2011 | Nikander et al. | 455/411 |
| 8,213,900 B2 * | 7/2012 | Heutschi et al. | 455/406 |
| 8,230,073 B1 * | 7/2012 | Leeder et al. | 709/227 |
| 2004/0131023 A1 * | 7/2004 | Auterinen | 370/328 |
| 2004/0166874 A1 * | 8/2004 | Asokan et al. | 455/456.1 |
| 2005/0198036 A1 * | 9/2005 | Nedkov et al. | 707/10 |

(Continued)

FOREIGN PATENT DOCUMENTS

| | | |
|---|---|---|
| WO | WO 02/069605 A | 9/2002 |
| WO | WO 03/065640 A | 8/2003 |

OTHER PUBLICATIONS

Stefano M Faccin Franck Le Nokia Research Center: "AAA Local Security Association (LSA) : The Temporary Shared Key (TSK)" IETF Standard-Working-Draft, Internet Engineering Task Force, IETF, CH. Jul. 2001, XP015031409.

(Continued)

*Primary Examiner* — Syed A. Zia

(57) ABSTRACT

A server in a home domain for managing the authentication of clients that are subscribers of the home domain, but are attached to a visited domain. Based on knowledge of the type of security being used in an access network of the visited domain, the server determines whether a given client is to be authenticated by the visited domain or the home domain. The server then signals the result to the visited domain.

14 Claims, 6 Drawing Sheets

U.S. PATENT DOCUMENTS

| | | | |
|---|---|---|---|
| 2006/0104306 A1* | 5/2006 | Adamczyk et al. | 370/466 |
| 2007/0100981 A1* | 5/2007 | Adamczyk et al. | 709/223 |
| 2007/0127495 A1* | 6/2007 | de Gregorio et al. | 370/395.52 |
| 2008/0072301 A1* | 3/2008 | Chia et al. | 726/8 |
| 2008/0155659 A1* | 6/2008 | Gazier et al. | 726/4 |
| 2008/0270794 A1* | 10/2008 | Falk et al. | 713/168 |
| 2009/0313466 A1* | 12/2009 | Naslund et al. | 713/155 |
| 2010/0097977 A1* | 4/2010 | Rommer et al. | 370/315 |

OTHER PUBLICATIONS

Miyoung Kim Youngsong Mun Soongsil University: "Localized Key Management for AAA in Mobile IPv6" IETF Standard-Working-Draft, Internet Engineering Task Force. IETF, CH, Oct. 2002, XP015032831.

Wireless World Research Forum: "Research Issues for Fast Authentication in Inter-Domain Handover" WWRF. [Online] Feb. 2004, XP002425724 Retrieved from the Internet URL:http://www.docomoeurolabs.de/pdf/publications/STL_research_issues_fast_authentication.pdf> [retrieved on Mar. 20, 2007] * Section 3 and 4*.

"Symmetric security procedures for H.323 mobility in H.510" ITU-T Standard in Force (I), International Telecommunication Union, Geneva CH, No. H530 3/2.Mar. 29, 2002, XP017401532 * Sections 7 and 8*.

* cited by examiner

METHOD AND APPARATUS FOR DETERMINING AN AUTHENTICATION PROCEDURE

TECHNICAL FIELD

The present invention relates to a method and apparatus for determining an authentication procedure to be applied to a client accessing or attempting to access services via a visited domain whilst having a service agreement with a home domain.

BACKGROUND

In the case of cellular telephone networks, a standard operating model has evolved over the years to enable users to roam outside of the home domain to which they subscribe, into so-called visited domains. This model allows users to roam in visited (e.g. foreign) domains whilst ensuring that the visited domain operators can recover incurred costs from the home domain. At the same time, the home domain operator can trust the visited domain operators to recharge only costs that are actually incurred. A key component of this model is a mechanism for allowing a visited domain to authenticate a user as a subscriber of the home domain. The visited domain needs assistance from the home domain to implement this mechanism. The typical approach is to provide within the home domain an "authentication server" which maintains long-term authentication credentials for a user and is the "root of trust" for the user. An "authenticator" is provided within the visited domain and performs the actual authentication by communication with the authentication server and the user (or "client").

3GPP TS 33.102 describes a security architecture for the Universal Mobile Telecommunications Service (UMTS) networks which is, as far as possible, compatible with the pre-existing GSM networks. TS 33.102 considers in particular the Authentication and Key Agreement (AKA) security protocol which is a mechanism for performing authentication and session key distribution. AKA is a challenge-response based mechanism that uses symmetric cryptography. Within a client terminal, AKA is typically run in a UMTS Subscriber Identity Module (USIM) which resides on a smart card like device. The smart card possesses a secret K which is also known to an Authentication Centre (AuC) located within the user's home domain. When a user attempts to register with a visited domain, the AKA mechanism is run between the client terminal and the visited domain, involving the home domain as a "back-end". This process involves the visited domain being provided, by the home network, with an authentication vector comprising a challenge and an expected result. The challenge is forwarded by the visited domain to the client terminal, which generates a challenge response (within the USIM) and returns this to the visited domain. If the challenge response matches the expected result, the visited domain authorises the client terminal to use its access services. AKA also allows the client terminal to verify that its home domain has indeed been involved in the signalling process, which in turn allows the terminal to authenticate the visited domain.

The AKA authentication vector is good for only one access attempt by the client. If the client terminal subsequently deregisters from the visited domain (e.g. the terminal is powered down), a new authentication vector is required for any further registration. TS 33.102 allows for the home domain to provide to the visited domain a set of authentication vectors at first registration, enabling the visited domain to perform multiple authentications for a given client terminal without having to contact the home domain for each individual registration.

Authentication in 2G networks is handled using a challenge and response approach similar to AKA.

The 2G and 3G approaches to security enable (local) mobility and hand-overs since the home domain does not need to be involved in sub-sequent re-authentications. For example, in the case of a terminal transferring to a 2G access from a 3G access (where both accesses belong to the same operator), a user can be implicitly authenticated/authorised in the new access by reuse of the previously used session keys. However, delegating responsibility for authentication to the visited network may not always be satisfactory for the home domain, as the home domain must "blindly" trust that the visited domain is not making a false claim about the client's presence in the visited domain, or that the client is receiving the paid for services, etc. Whilst this trust model has worked well for established network operators, it may not apply to future network configurations as will be discussed below.

In the case of the Internet, the IETF has created under the heading Authentication, Authorization, and Accounting (AAA), a set of protocols for achieving authentication of a user within a visited domain. The currently implemented protocols include RADIUS and DIAMETER. A typical Internet scenario might involve a user attempting to use a WLAN hotspot (located for example in an Internet café or airport terminal) as an access network, when the user is a subscriber of an Internet Service Provider (ISP) broadband network. In the IETF model, authentication is done in the home domain, i.e. the authenticator and authentication server are both in the home domain. While this may be satisfactory to the home domain, it leads to sub-optimal performance due to the signalling overhead and impairs smooth hand-over/mobility within the visited domain.

It is noted that where the access domain is a wireless network, a wireless terminal may communicate with a AAA client/authenticator within the access domain, with the AAA client communicating with a AAA server in the home domain. End-to-end authentication signalling may be conveyed using the Extensible Authentication Protocol (EAP) which is an authentication framework rather than an actual authentication method. One of the roles of EAP is to implement an authentication method between endpoints. The EAP-AKA method is one example of such an authentication method. In this approach therefore, AKA data will be contained within EAP messages which are in turn contained within DIAMETER messages (for the AAA client to AAA server leg). [UMTS AKA as described above is a 3GPP-specific protocol which does not use AAA and EAP frameworks and should not be confused with EAP-AKA, although of course the actual AKA mechanism is common to both.]

This current protocol "architecture" is illustrated in FIG. 1, where the wireless access network is a 802.11 (WLAN) network and the AKA endpoint is in the home domain. The AAA client/authenticator within the wireless network understands the EAP signalling, and converts EAP in the AAA signalling to EAP over LAN. The AAA client/authenticator is transparent to AKA. It is noted that one or more AAA proxies may be present between the visited and home networks.

Communication standards are evolving to provide for the integration of different heterogeneous access domains into one single logical network. This will result in 3GPP-based access domains (e.g. GPRS, UMTS, LTE) and non-3GPP based access domains (e.g. Wimax, WLAN, Fixed-Line broadband, etc) merging to form one logical network (see for example 3GPP 3GPP TR 23.882). A home domain will likely ustilise AAA (e.g. DIAMETER) and EAP, and multiple EAP-methods (such as EAP AKA, EAP SIM, EAP TLS, etc) to communicate with the different access domains and terminals. It is however inevitable that a given home domain will place different levels of trust on different access domains. For example, a high level of trust might be placed on a 3G access domain, whilst a very low level of trust may be placed on an Internet café WLAN.

SUMMARY

According to a first aspect of the present invention there is provided a server for managing the authentication of clients that are subscribers of a home domain within which the server is located, the server comprising means for determining whether a client that is attached to a visited domain is to be authenticated by the home domain or by said visited domain, and for signalling the result to said visited domain.

Embodiments of the present invention introduce a dynamic flexibility into the authentication process. It is now possible for the home domain to determine where the authentication is to take place based upon static properties such as client subscription, and on changing properties such as visited network identity. This results in a service architecture which optimises signalling routes when appropriate whilst maintaining financial security.

The server may comprise a non-transitory memory for storing authentication data for the clients. The server is arranged, in the event that it determines that the visited network is to be responsible for authentication, to generate session data and to send this session data to the visited network. Where the visited network is a 3G network, this data may comprise an authentication vector.

In certain embodiments of the invention, the server comprises an interface for communicating with visited domains, first processing means for receiving via said interface a registration request sent by a visited domain in respect of one of said clients, and second processing means for determining whether the request is to be authenticated by the home domain or by the visited domain. The second processing means is arranged, in the former case, to authenticate the request and signal the result to the visited domain via said interface, and, in the latter case, to signal to the visited domain via said interface that the visited domain is to be responsible for authenticating the request.

Said first processing means may be further arranged to receive via said interface a request from a visited network to transfer the authentication decision from one domain to another, in the case of a previously authenticated client. Said second processing means is arranged to make a further determination and to notify the visited network accordingly.

The server may comprise means for determining that a previous decision to delegate an authentication procedure to the visited domain is to be revoked, and for signalling that decision to the visited domain.

It is noted that the authentication procedure which may be delegated to the visited domain may be a second level procedure. A first level procedure may be carried out by the home domain based, for example, upon terminal and/or user identity, prior to conducting the second level procedure at the home domain or, if delegated, at the visited domain.

According to a second aspect of the present invention there is provided a server for authenticating clients attached to the domain within which the server is located, where the clients are subscribers of different, home domains, the server being arranged to communicate with a home domain to receive instructions therefrom as to whether a client is to be authenticate by its home domain or by the visited domain and, in the latter case, to carry out the authentication of the client based upon information received from the home domain.

According to a third aspect of the present invention there is provided a method of authenticating a client attached to a visited domain, where the client is a subscriber of a home domain, the method comprising:

sending an authentication request from the visited domain to the home domain in respect of said client;
in the home domain, determining whether the client is to be authenticated by the home domain or by said visited domain;
in the event that the client is to be authenticated by the home domain, carrying out said authentication in the home domain and signalling the result to the visited domain; and
in the event that the client is to be authenticated by the visited domain, sending authentication data from the home domain to the visited domain, and using said data in the visited domain to authenticate the client.

In the case of the AAA protocol, said authentication request may be a DIAMETER Request. In the case that the authentication is to be carried out by the home domain, this is signalled to the visited domain by sending a NACK. The result of the authentication is subsequently signalled to the visited domain by sending an ACCEPT/REJECT message. Authentication involves the exchange of a challenge and response between the home domain and the client. In the case where the authentication is to be carried out by the visited network, this is signalled to the visited domain by sending an ACK message, together with authentication data. A challenge and response exchange is conducted between the client and the visited domain.

DETAILED DESCRIPTION

Figure 1:
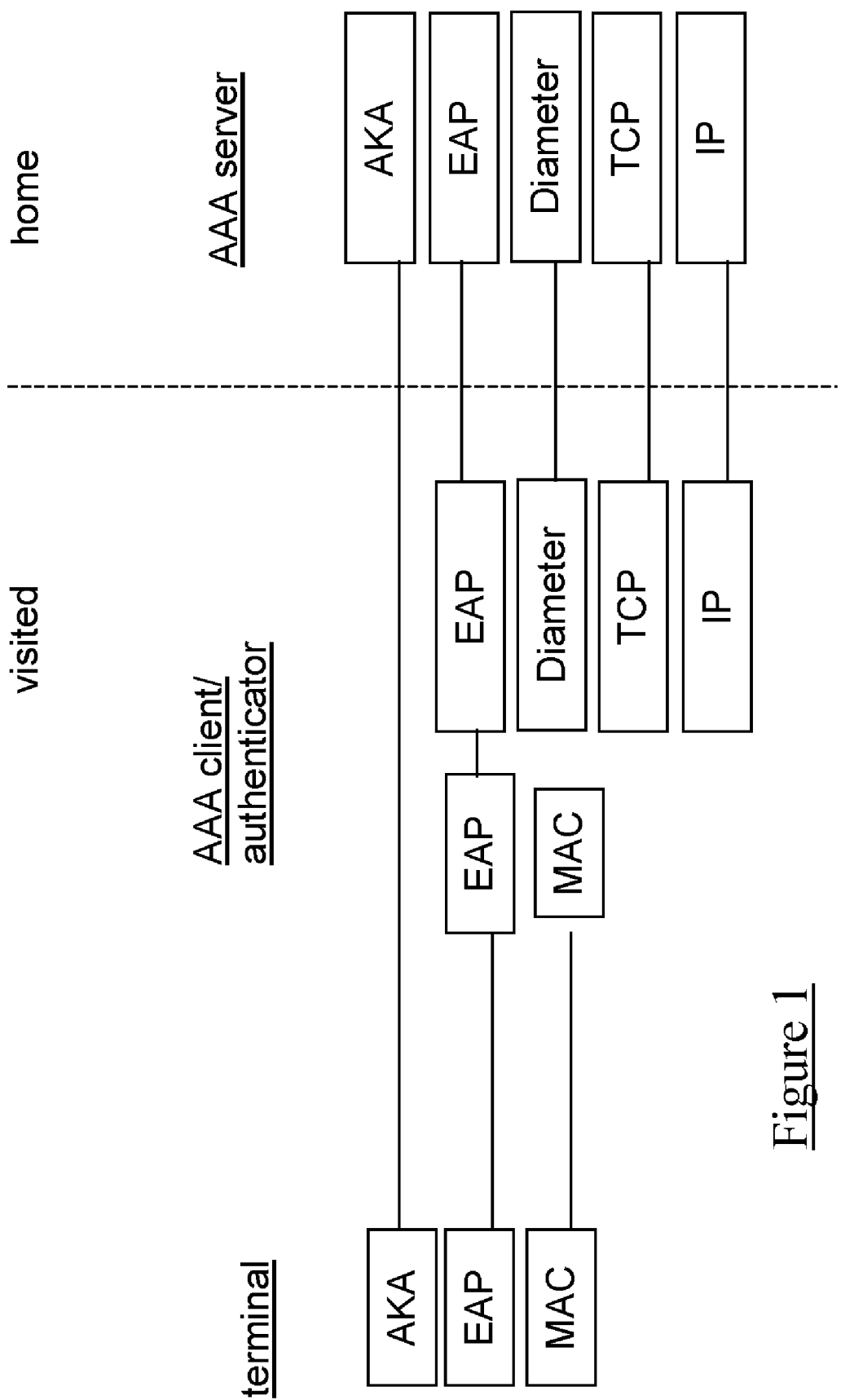
FIG. 1 illustrates various protocol layers involved in an authentication procedure for a wireless terminal attached to a visited network.
Figure 2:
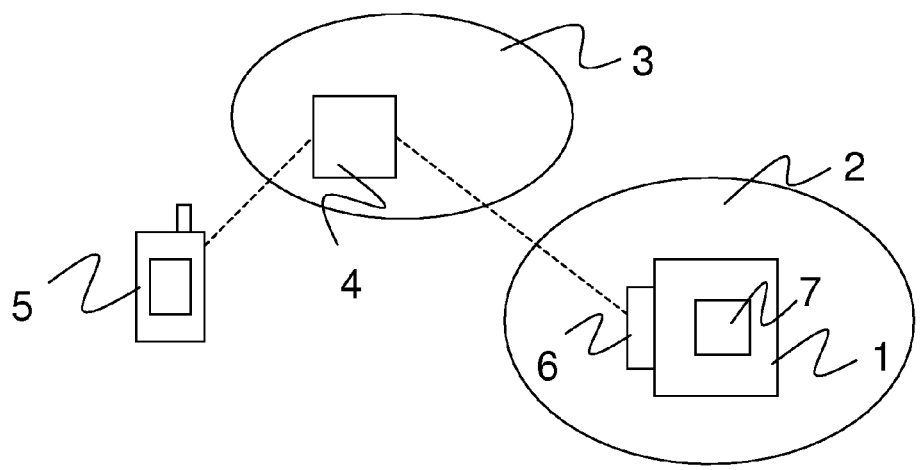
FIG. 2 illustrates schematically a communications system architecture comprising visited and home domains.

There is illustrated in FIG. 2 a generic visited domain/home domain architecture, which allows for roaming of subscribers (referred to below as "clients") of the home domain into the visited domain. An authentication server 1, controlled by a processor and non-transitory memory, is located within the home domain 2 and maintains in a second non-transitory memory, long-term authentication credentials of the home domain's clients. The authentication server may also act as authenticator for clients seeking to register with visited domains including the illustrated domain 3. A separate authenticator 4 is located within the visited domain 3. FIG. 2 illustrates a client 5 attached to the visited domain 3.

The authentication server 1 receives access requests from a visited domain via an interface 6, whereupon processing means 7 within the authentication server makes decisions as to whether authentications are to be performed within the home domain or can be delegated to the visited domain. The server may also determine that authentications are shared between the home and visited domains. For example, it may determine that only the first authentication is to be performed by the home domain and subsequent authentications are delegated to the visited domain, or that only every tenth authentication is to be performed by the home domain, etc. The server makes these decisions based upon certain available information. This information may include, for example, one or more of the following; visited operator identity, access network type, user-id, type of network security being used in the access network of the visited domain, type of user authentication being carried out, selected Access Point Name (APN), Quality of Service (QoS) requirement, charging rules, type of subscription, type of terminal, user location (e.g. certain geographical areas might be considered less secure from a telecommunication point of view).

Figures 3A, 3B:
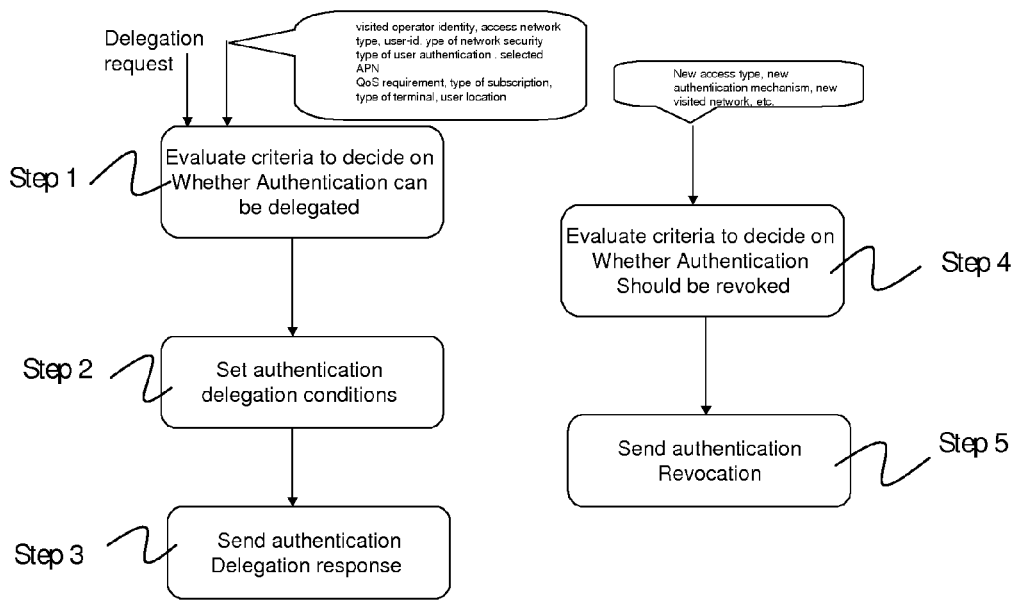
FIGS. 3a and 3b are flow diagrams illustrating authentication decision processes carried out with an authentication server of a home domain.

FIG. 3a is a flow diagram illustrating the delegation decision process taken by the authentication server within the home domain, namely evaluate input criteria (step 1), set authentication delegation conditions (step 2), and send authentication delegation response to visited domain (step 3). FIG. 3b is a flow diagram illustrating a delegation revocation decision process taken by the authentication server. On the basis of newly received input criteria (e.g. received from the visited domain), the authentication server evaluates the criteria to make the revocation decision (step 4), and sends an authentication revocation to the visited domain (step 5).

In the case that the DIAMETER AAA protocol (IETF RFC 3588) is used between the visited and home domains, the access request is typically carried by a DIAMETER Request message sent between a AAA-client (possibly via AAA-proxy) in the visited domain and a HSS/AAA server within the home domain. The home authentication server responds either by sending a DIAMETER Answer message containing a DIAMETER AVP (attribute-value-pair) with authentication data to be used by the visited domain, or by sending to the visited domain a special "NACK" message, informing the visited domain to allow the authentication procedure to proceed between the client and the home domain. Depending upon the response that it receives, the visited domain either just relays authentication related authentication signalling (e.g. EAP AKA signalling), or uses the authentication data received from the home domain to initiate some or all subsequent authentication signalling with the client. It is noted that in the case of AKA authentication method, the AKA authentication vector, i.e. (RAND, XRES, AUTN, Ck, Ik) contains all of the information that the visited domain needs to assume the role of authenticator.

If the decision was to delegate authentication to the visited domain, the home domain still has the option to "revoke" the delegation, in which case any subsequent (re-) authentication takes place in the home domain. DIAMETER supports server-initiated requests that can be used for this purpose. The home domain operator can also delegate authentication to the visited domain for a limited time or a limited number of re-authentications only, after which the visited domain must relay authentication signalling back to the home domain (at least until the home domain once again delegates responsibility for authentication to the visited domain). The home domain operator can also decide that every $N^{th}$ authentication should be relayed by the visited domain back to the home domain. Any one of these approaches creates "check points" at which the home domain can choose to continue with or change the applied authentication policy. As DIAMETER generally requires the maintenance of session state information (e.g. for the purpose of accounting), this state information can be extended with information enabling the visited domain to decide when to perform authentication locally and when to defer it to the home domain.

It will be appreciated that the procedure described here does offer the visited domain the opportunity to refuse to "erase" authentication data it already has, and to continue to take the authenticator role even if the home domain revokes the delegated rights. However, in such a circumstance the visited network cannot be guaranteed that it will be paid for used services. In any case, the client itself may elect not to continue.

Figure 4:
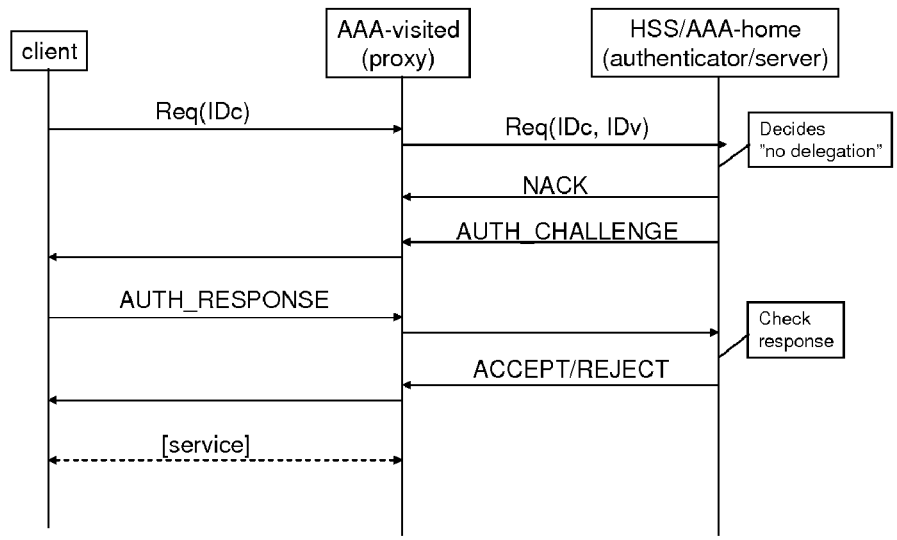
FIG. 4 shows authentication related signalling for the case where a home domain takes the decision not to delegate responsibility for authentication to a visited domain.

FIG. 4 shows authentication related signalling for the case where the home domain takes the decision not to delegate responsibility for authentication to the visited domain. This may be implemented using the DIAMETER AAA protocol. The initial request Req(IDc) is supplemented with the IDv at the AAA-visited server, and forwarded to the HSS/AAA home server (possibly via a AAA proxy). The latter determines (based upon available information and policies) that no delegation is permitted, and returns a NACK to the AAA-visited server. The challenge response process is then conducted between the HSS/AAA home authenticator and the client.

Figure 5:
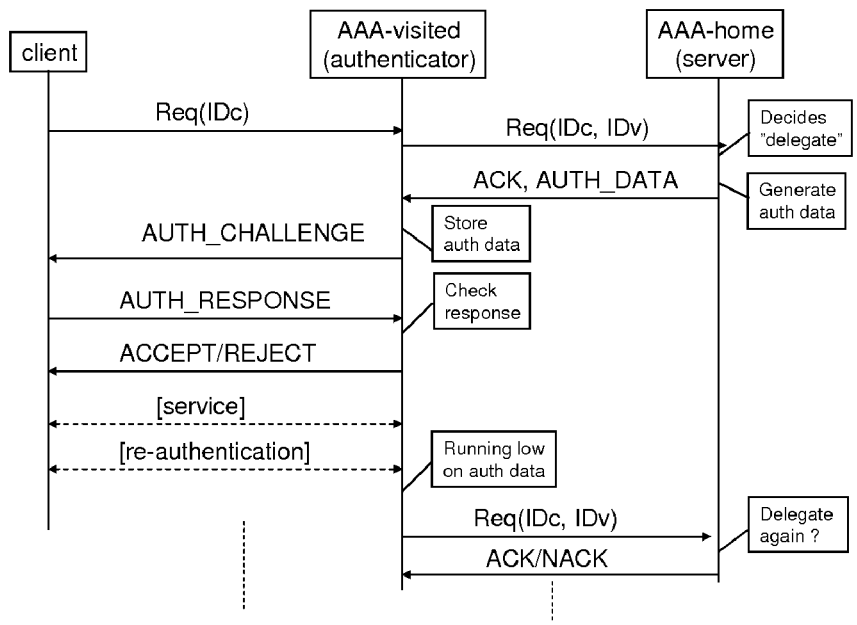
FIG. 5 shows signalling associated with the case where a home domain decides to delegate responsibility for authentication to a visited domain for a limited period or number of tries.

FIG. 5 shows signalling associated with the case where the home domain decides to delegate responsibility for authentication for a limited period or number of tries. After receiving the request, the AAA-home server provides authentication data to the AAA-visited authenticator. The latter stores the received data and proceeds to authenticate the client using the received data and a challenge-response procedure. One or more re-authentications can be performed by the visited domain before it must revert to the home domain for a refresh (or denial) of the delegation.

Figure 6:
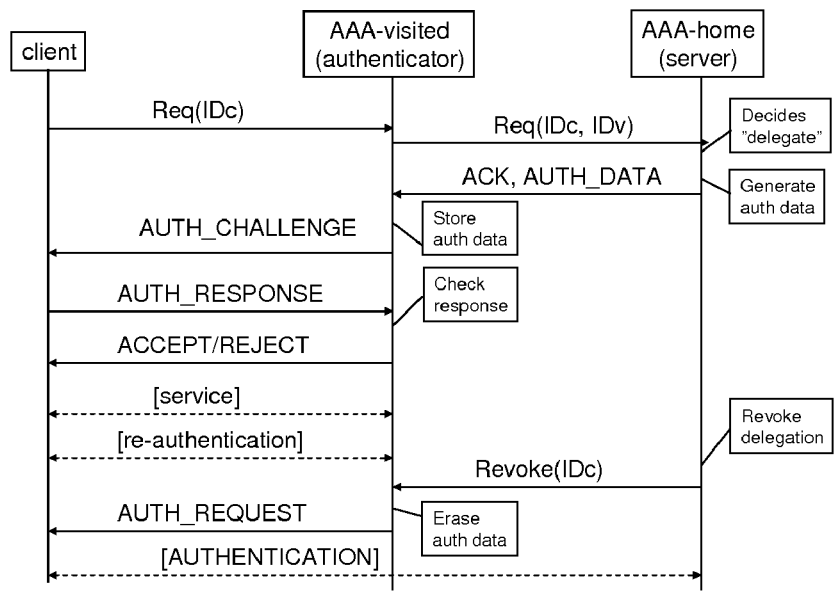
FIG. 6 shows signalling associated with the delegation of authentication responsibility to a visited domain, with a subsequent decision to revoke that permission.

FIG. 6 shows signalling associated with the case where the home domain delegates authentication responsibility to the visited domain, but subsequently decides to revoke that permission. The home domain does this by sending a Revoke (IDc) message to the AAA-visited authenticator. This will typically force the client to re-authenticate at the home domain.

It is possible that in some cases a visited domain to which authentication responsibility has previously been delegated (or which is configured to provide authentication by default), can request that the home domain change the authentication domain. This may arise, for example, in the following circumstances:

The visited domain wishes to reduce its authentication signalling load;
The visited domain wants to ensure that the home domain is continuously aware of the presence of its roaming user in the visited domain; or The client requests an APN or QoS that the visited domain deems requires authentication in the home domain.

Figure 7:
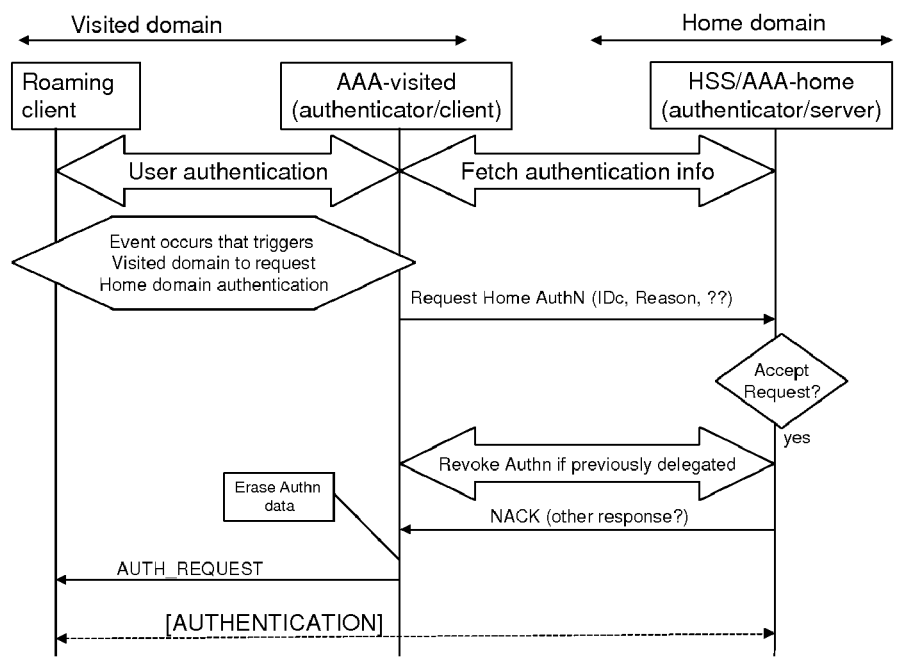
FIG. 7 is a signalling chart illustrating a case where a visited domain elects to request a transfer of authentication responsibility back to a home domain.

A signalling chart illustrating this process is shown in FIG. 7.

Figure 8:
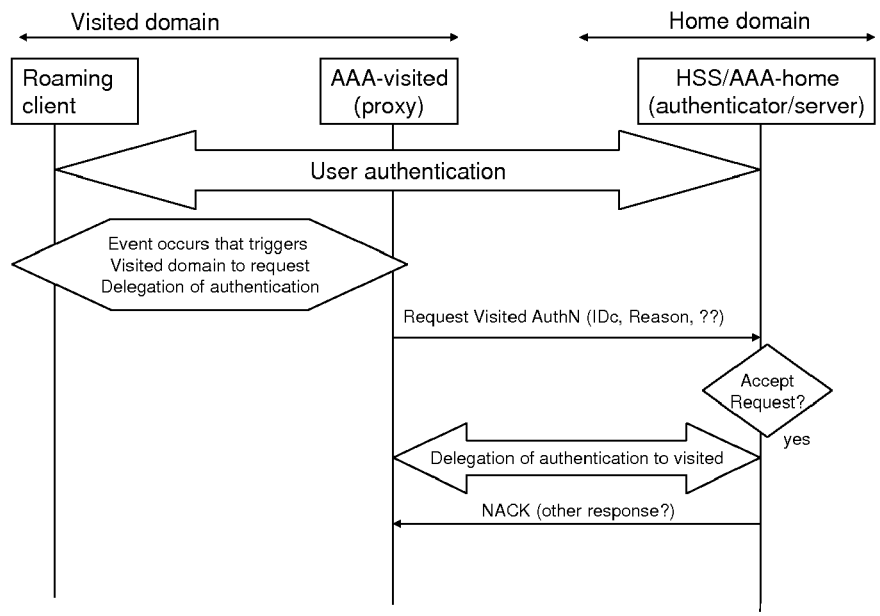
FIG. 8 is a signalling chart illustrating a case where a visited domain elects to request a transfer of authentication responsibility to it, from the home domain.

FIG. 8 shows a signalling chart illustrating the case where the home domain has determined that it must be responsible for client authentication, and the visited domain subsequently requests that responsibility for authorisation be transferred from the home domain to the visited domain. This situation may arise, for example, when a client requests an APN local to the visited domain or local breakout takes place, and in which cases the visited domain prefers to authenticate the client itself.

Figure 9:
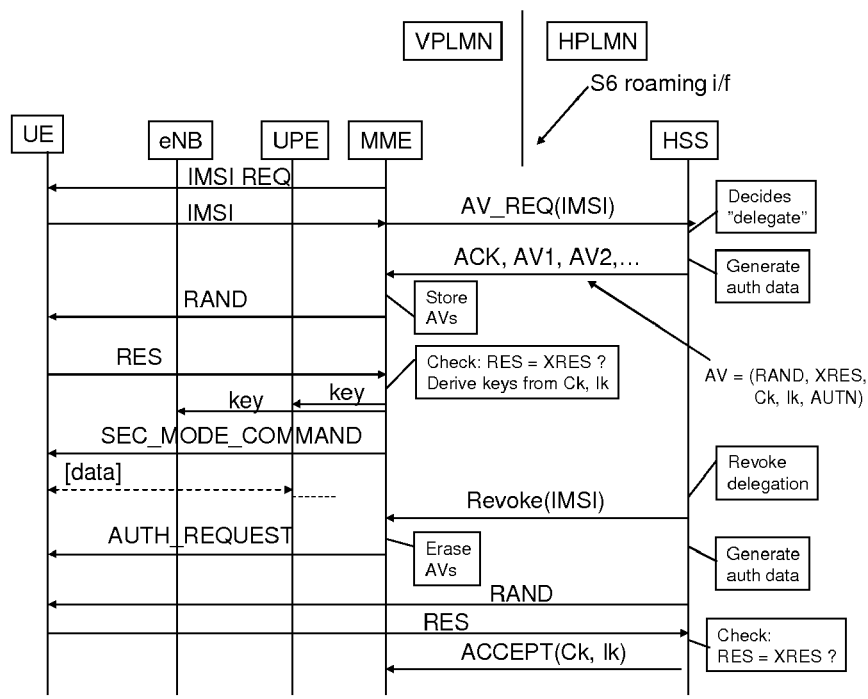
FIG. 9 illustrates a signalling flow in the case where a client is attached to a future 3GPP Long Term Evolution (LTE) based access domain.

Referring now to FIG. 9, this illustrates a signalling flow in the case where the client (UE) is attached to a future 3GPP Long Term Evolution (LTE) based access domain (considering here OFDM, Rel8). Typically, DIAMETER AAA will be deployed between the home and visited domains. Here, the initial user authentication is performed using AKA, with the authenticator being implemented at the MME within the visited domain (the "VPLMN"). The HSS within the home domain (the "HPLMN") provides the required authentication vector to the MME upon receipt of the request. The session key included in the authentication vector is passed by the MME to the eNB via the UPE. The flow illustrates the case where the HPLMN subsequently decides to revoke the authentication permission previously given the VPLMN, whereupon the MME sends an AUTH REQUEST to the client. The challenge and response procedure is then conducted between the client and the HPLMN and, assuming this is successful, the session keys are sent from the home HPLMN to the VPLMN.

Figure 10:
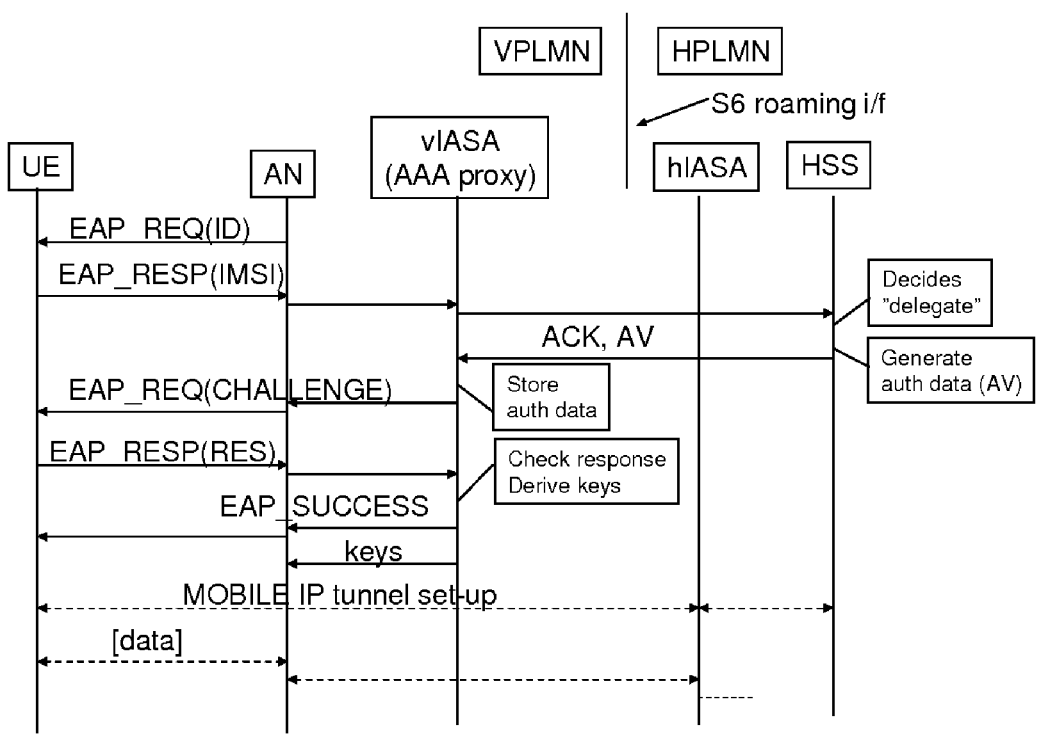
FIG. 10 shows a signalling flow in the case where a client is attached to an I-WLAN access domain.

FIG. 10 shows a signalling flow in the case where the client is attached to an I-WLAN access domain. Typically, in the case of a WLAN access domain, authentication would be performed within the home domain. However, in this example, upon receipt of the EAP_RESPONSE(IMSI), the home domain elects to delegate authentication responsibility to the access domain. In the illustrated case, it is the IASA in the VPLMN which acts as authenticator after delegation. In principle however, this role could be performed by the Access Node (AN) although this approach would be less secure.

It will be appreciated by the person of skill in the art that various modifications may be made to the above described embodiments without departing from the scope of the present invention.

The invention claimed is:

1. A server for managing the authentication of clients that are subscribers of a home domain within which the server is located, the server comprising a processor and a non-transitory memory for storing computer program instructions, wherein when the processor executes the computer program instructions, the server is caused to:

determine whether a client that is attached to a visited domain is to be authenticated by the home domain or by said visited domain, wherein the server is configured to select the visited domain to authenticate the client when security procedures utilized in an access network of the visited domain provide the server with a level of trust in the visited domain's security capabilities, and the server is configured to select the home domain to authenticate the client when the security procedures utilized in the access network of the visited domain do not provide the server with the level of trust; and send a message to the visited domain instructing the visited domain to either send authentication information of the client to the server for authentication in the home domain or perform an authentication in the visited domain, depending on a result of the determination;

wherein when the client is to be authenticated by the home domain, the server is caused to authenticate the client and to signal the result to the visited domain; and wherein, in the case of a previously authenticated client, when the server receives a request from a visited network to transfer the authentication decision from one domain to another, the server is caused to make a further determination as to whether the previously authenticated client is to be authenticated by the home domain or by the visited domain, and to notify the visited network accordingly.

2. The server according to claim 1, further comprising a second non-transitory memory for storing authentication data for said clients.

3. The server according to claim 1, wherein the server is also caused to generate session data and to send the session data to the visited network when the server determines that the visited network is to be responsible for authentication.

4. The server according to claim 1, wherein the server is also caused to determine that a previous decision to delegate an authentication procedure to the visited domain is to be revoked, and to signal to the visited domain that the previous decision to delegate the authentication procedure to the visited domain is revoked.

5. The server according to claim 1, wherein the server is caused to send the message to the visited domain using an Authentication, Authorization, and Accounting (AAA) protocol.

6. The server according to claim 1, wherein the server is caused to communicate with said client using the Extensible Authentication Protocol (EAP).

7. The server according to claim 1, wherein the server is caused to communicate with said client using Universal Mobile Telecommunication Service Authentication and Key Agreement (UMTS AKA).

8. The server according to claim 3, wherein said session data is an authentication vector.

9. The server according to claim 5, wherein said AAA protocol is RADIUS or DIAMETER.

10. The server according to claim 6, wherein the authentication method is Extensible Authentication Protocol Authentication and Key Agreement (EAP AKA).

11. A method of authenticating a client attached to a visited domain, where the client is a subscriber of a home domain, the method comprising:

sending an authentication request from the visited domain to the home domain regarding the client;

in the home domain, determining whether the client must be authenticated by the home domain or whether authorization to authenticate the client can be delegated to the visited domain, wherein a server in the home domain is configured to select the visited domain to authenticate the client when security procedures utilized in an access network of the visited domain provide the server with a level of trust in the visited domain's security capabilities, and the server is configured to select the home domain to authenticate the client when the security procedures utilized in the access network of the visited domain do not provide the server with a the level of trust;

upon determining the client is to be authenticated by the home domain, sending a message from the server in the home domain to the visited domain instructing the visited domain to send authentication information of the client to the server, carrying out said authentication in the home domain, and signaling the result to the visited domain;

upon determining that authorization to authenticate the client can be delegated to the visited domain, sending authentication data from the server in the home domain to the visited domain, and using the authentication data in the visited domain to authenticate the client;

receiving by the server, a request from a visited network to transfer the authentication decision from one domain to another for a previously authenticated client; and determining by the server, whether the previously authenticated client is to be authenticated by the home domain or by the visited domain, and notifying the visited network accordingly.

12. The method according to claim 11, wherein the home domain and the visited domain communicate using an Authentication, Authorization, and Accounting (AAA) protocol, and the home domain and the client communicate using the Extensible Authentication Protocol (EAP).

13. The method according to claim 11, wherein the Universal Mobile Telecommunication Service Authentication and Key Agreement (UMTS AKA) method is used to authenticate the client.

14. The method according to claim 12, wherein the Extensible Authentication Protocol Authentication and Key Agreement (EAP AKA) method is used to authenticate the client.

* * * * *